United States Patent
Mather et al.

(10) Patent No.: US 8,766,134 B2
(45) Date of Patent: Jul. 1, 2014

(54) ALIGNMENT FEATURES FOR A PLASMA TORCH CONNECTOR ASSEMBLY

(75) Inventors: Jonathan Mather, Cornish, NH (US); Adam Fitzpatrick, East Andover, NH (US)

(73) Assignee: Hypertherm, Inc., Hanover, NH (US)

( * ) Notice: Subject to any disclaimer, the term of this patent is extended or adjusted under 35 U.S.C. 154(b) by 542 days.

(21) Appl. No.: 13/030,875

(22) Filed: Feb. 18, 2011

(65) Prior Publication Data

US 2011/0198320 A1    Aug. 18, 2011

Related U.S. Application Data

(60) Provisional application No. 61/305,636, filed on Feb. 18, 2010.

(51) Int. Cl.
| | |
|---|---|
| *B23K 10/00* | (2006.01) |
| *H05H 1/34* | (2006.01) |
| *B23K 9/32* | (2006.01) |
| *B23K 9/013* | (2006.01) |
| *B23K 37/02* | (2006.01) |

(52) U.S. Cl.
CPC .................. *H05H 1/34* (2013.01); *B23K 9/323* (2013.01); *B23K 9/013* (2013.01); *B23K 10/00* (2013.01); *H05H 2001/3478* (2013.01); *B23K 37/0235* (2013.01)
USPC ............ 219/121.48; 219/121.39; 219/121.54; 219/137.63

(58) Field of Classification Search
CPC ................................. B23K 10/00; H05H 1/36
USPC ............ 219/121.48, 121.39, 121.54, 137.63, 219/121.45, 121.57
See application file for complete search history.

(56) References Cited

U.S. PATENT DOCUMENTS

| | | | |
|---|---|---|---|
| 4,423,304 A | | 12/1983 | Bass et al. |
| 5,624,586 A | * | 4/1997 | Sobr et al. ................ 219/121.48 |
| 6,020,572 A | | 2/2000 | Marner et al. |
| 6,078,023 A | * | 6/2000 | Jones et al. ............. 219/137.63 |
| 6,713,711 B2 | * | 3/2004 | Conway et al. .......... 219/121.48 |
| 6,881,921 B2 | | 4/2005 | Horner-Richardson et al. |
| 6,946,617 B2 | | 9/2005 | Brandt et al. |

(Continued)

FOREIGN PATENT DOCUMENTS

| | | |
|---|---|---|
| JP | 57 044467 | 3/1982 |
| WO | 88/04481 | 6/1988 |
| WO | 03/089183 | 10/2003 |

*Primary Examiner* — Mark Paschall
(74) *Attorney, Agent, or Firm* — Proskauer Rose LLP

(57) ABSTRACT

A connector assembly for coupling a plasma torch to a receptacle including a connector body configured to receive a mating connector body. The connector body is attachable to a power supply or a plasma arc torch. One or more circumferentially shaped blades extend axially from a surface of the connector body and form a blade ring. One or more gaps can be disposed relative to the surface of the connector body. The plurality of gaps are defined by and between the circumferentially shaped blades. A distance of the gaps between the circumferentially shaped blades extends along a portion of the circumference of the blade ring. The plurality of gaps can be asymmetrically distributed about the blade ring to facilitate proper rotational alignment, and are shaped to align with corresponding circumferentially shaped blades of the mating connector body.

18 Claims, 7 Drawing Sheets

(56) References Cited

U.S. PATENT DOCUMENTS

| | | |
|---|---|---|
| 7,019,254 B2 | 3/2006 | MacKenzie et al. |
| 7,071,443 B2 * | 7/2006 | Conway et al. .......... 219/121.48 |
| 7,161,111 B2 | 1/2007 | Schneider |
| 7,762,830 B2 * | 7/2010 | Roberts ........................ 439/350 |
| 2003/0160032 A1 | 8/2003 | Mackenzie et al. |
| 2007/0175871 A1 | 8/2007 | Brezni et al. |
| 2008/0116179 A1 | 5/2008 | Cook et al. |
| 2010/0264120 A1 | 10/2010 | Reinke et al. |

* cited by examiner

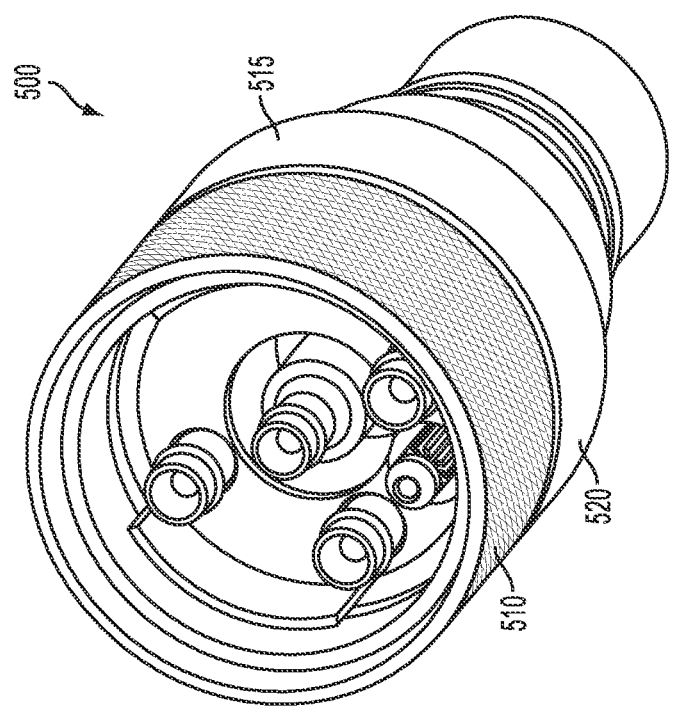
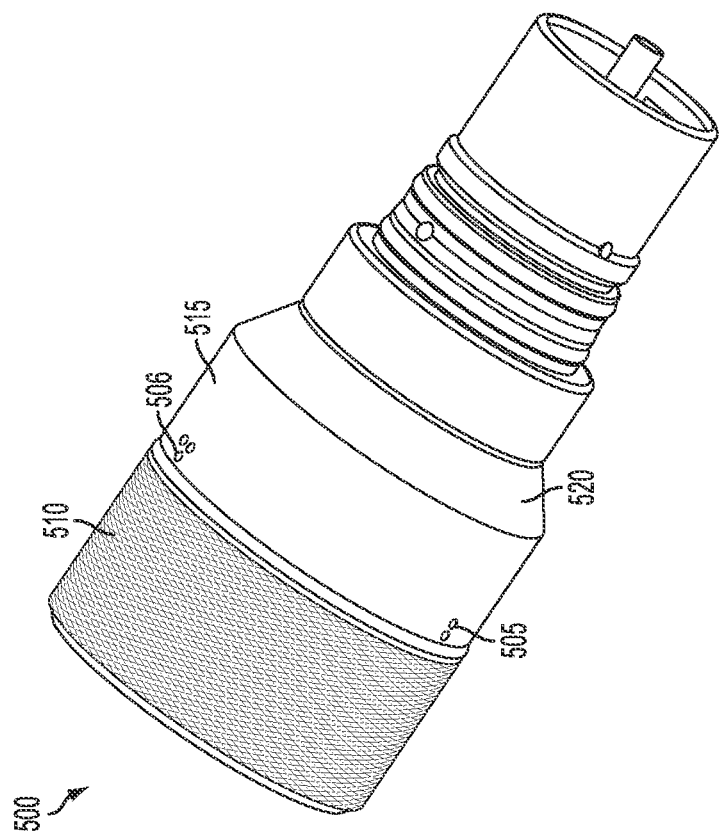

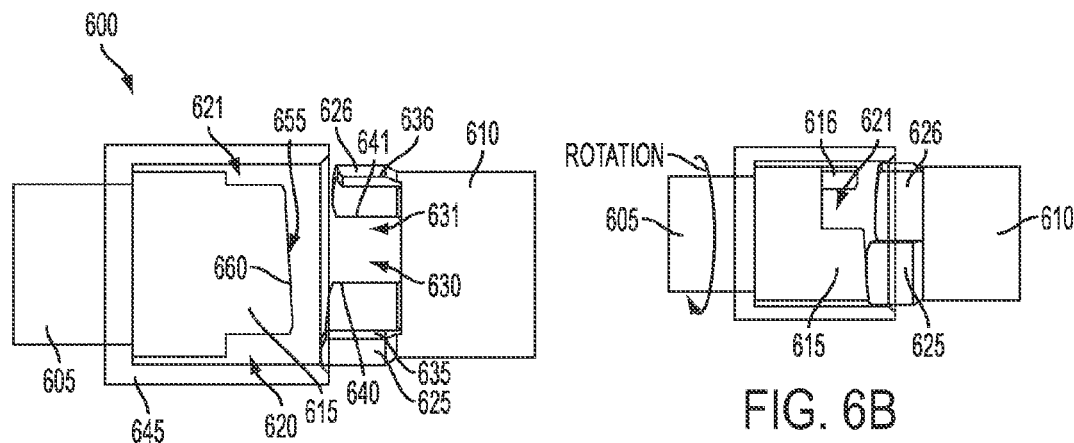
FIG. 6A
FIG. 6B
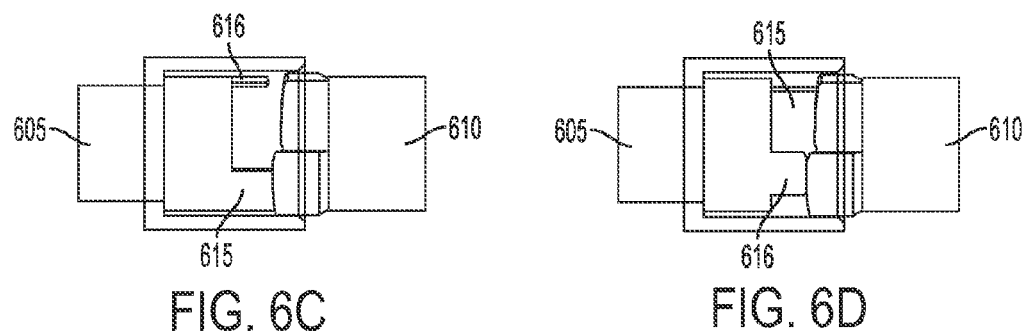
FIG. 6C
FIG. 6D
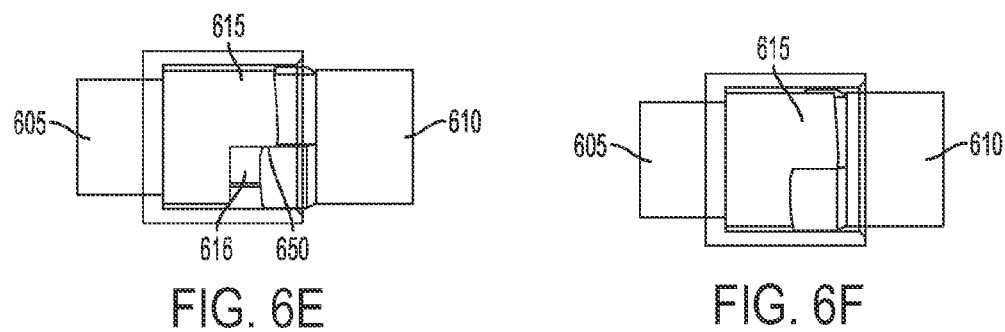
FIG. 6E
FIG. 6F

ALIGNMENT FEATURES FOR A PLASMA TORCH CONNECTOR ASSEMBLY

RELATED APPLICATIONS

This application claims the benefit of and priority to U.S. Provisional Application No. 61/305,636, filed Feb. 18, 2010, the entirety of which is hereby incorporated herein by reference.

TECHNICAL FIELD

The present invention relates generally to plasma arc cutting torches, and more particularly to improved alignment features for a plasma torch connector assembly.

BACKGROUND

Plasma arc torches are widely used for cutting metallic materials and can be employed in automated systems for automatically processing a workpiece. The system can include the plasma arc torch, an associated power supply, a positioning apparatus, and an associated controller. At least one of the plasma arc torch and the workpiece can be mounted on the positioning apparatus which provides relative motion between the torch and the workpiece to direct the plasma arc along a processing path.

A plasma torch generally includes an electrode and a nozzle having a central exit orifice mounted within a torch body, electrical connections, passages for cooling, passages for arc control fluids (e.g., plasma gas), and a power supply. A swirl ring can be employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be, for example, by a high frequency, high voltage signal.

The consumables (e.g., electrode, nozzle, etc.) in a mechanized torch are replaced frequently, for example, the consumables can be replaced every shift or approximately every eight hours the torch is in use. To replace the consumables, the torch is disconnected from the power supply to ensure the safety of the operator. The connector assembly that connects the torch to the power supply can be located within or blocked by portions of a gantry of the positioning device. Often, the operator cannot see the connector assembly and must align several gas and coolant tubes, power and signal connections without being able to have an adequate view of the connection point. (See e.g., FIG. 3B of U.S. Pat. No. 5,624,586 as an example of the connections to be made.) This can result in the gas and/or coolant tubes being misaligned, which can lead to damage of the plasma arc torch and/or receptacle.

SUMMARY OF THE INVENTION

What is needed is a connector assembly that can be quickly and correctly aligned and installed without causing unnecessary wear, leakage, and/or damage to the gas, fluid, and electrical connections in the torch and/or receptacle. In addition, what is needed is a connector assembly that can be quickly and correctly aligned by feel when the operator is not able to visually see the connection point. Visual cues on the connector assembly or an exterior shell housing the connector assembly can help an operator to quickly and easily align the torch with the receptacle when the operator is able to see the connection point. Reducing of the overall length of the torch can also help an operator quickly and easily align the torch with the receptacle.

The invention, in one aspect, features a connector assembly for coupling a plasma torch to a receptacle. The connector assembly includes a connector body configured to receive a mating connector body. The connector body is attachable to the receptacle or the plasma arc torch. The connector assembly also includes at least one circumferentially shaped blade extending axially from a surface of the connector body. The at least one circumferentially shaped blade forms a portion of a blade ring. At least one gap is disposed relative to the surface of the connector body and is defined by and between edges of the at least one circumferentially shaped blade. A distance of the at least one gap between the edges of the circumferentially shaped blade extends along a portion of the circumference of the blade ring. The at least one gap is distributed about the blade ring. The at least one gap is shaped to align with a corresponding circumferentially shaped blade of the mating connector body.

The invention, in another aspect, features a plasma arc torch that includes a torch body having a distal end and a proximal end. Torch fittings extend from the distal end of the torch body and include an electrical connector and a plurality of fluid connectors. A connector assembly is capable of coupling the distal end of the torch body to a receptacle. The connector assembly has a connector body. At least a portion of a blade ring extends axially from a surface of the connector body. The blade ring has a first top edge and a second top edge. An axial distance to the first top edge is greater than an axial distance to the second top edge relative to the surface of the connector body.

The invention, in another aspect, features a method of connecting a plasma torch to a plasma torch receptacle. Circumferentially shaped blades of a connector body are abutted to an aligning surface of a mating connector body. The mating connector body has gaps corresponding to the circumferentially shaped blades of the connector body. The connector body is rotated relative to the mating connector body until the circumferentially shaped blades of the connector body reach the corresponding gaps of the mating connector body. The connector body is axially biased towards the mating connector body such that the circumferentially shaped blades of the connector body mate with the corresponding gaps of the mating connector body and rotational movement of the connector body relative to the mating connector body is restricted.

In some embodiments, the at least one circumferentially shaped blade has a pitch along a circumferential outer edge along the blade ring to facilitate rotational alignment of the connector assembly. The pitch of the at least one circumferentially shaped blade can be about 0.25 inches per 5.2 inches.

The connector assembly can also include a plurality of circumferentially shaped blades. Edges of the plurality of circumferentially shaped blades can define a plurality of gaps. The plurality of gaps can be asymmetrically distributed about the blade ring. For example, the gaps can be asymmetrical in their size, shape, and/or location along the blade ring. In some embodiments, the plurality of circumferentially shaped blades are asymmetrically distributed about the blade ring. For example, blades can be asymmetrical in their size, shape, and/or location along the blade ring. In some embodiments, the circumferentially shaped blades have varying circumferential lengths or varying heights. In some embodiments, the at least one gap is configured to align with the corresponding circumferentially shaped blade of the mating connector body in a single rotational position. The plurality of gaps can be configured to align with the corresponding circumferentially shaped blades of the mating connector body in a single rotational position.

The connector assembly can also include alignment features on an exterior surface of the connector body. The alignment features can include at least one of dots, hash marks, or arrows.

In some embodiments, the connector assembly can also include an exterior shell configured to receive the connector body. The exterior shell can surround at least a portion of the connector body.

The connector assembly can also include a coupling nut coupled to an exterior surface of the exterior shell. The coupling nut can be configured to reversibly join the connector assembly and the mating connector assembly. In some embodiments, the coupling nut is coupled to an exterior surface of the connector body and is configured to reversibly join the torch body and the receptacle.

In some embodiments, the connector assembly includes the mating connector body. The mating connector body can be configured to receive the connector body.

The receptacle can have a corresponding blade ring that is shaped to align with the blade ring of the connector assembly. Rotational movement of the connector body relative to the receptacle can be restricted at an alignment point.

In some embodiments, rotating the connector body relative to the mating connector body is facilitated by a pitch along a circumferential outer edge along the blade ring. The connector body can be coupled to the mating connector body with a coupling nut. The aligning surface of the mating connector body can include circumferentially shaped blades. In some embodiments, the aligning surface is a surface of the mating connector body that includes pockets shaped to receive circumferentially shaped blades of the connector body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5A is a perspective view of a connector body with alignment features, according to an illustrative embodiment of the invention.

FIG. 5B is a perspective view of a connector body with a coupling nut, according to an illustrative embodiment of the invention.

FIGS. 6A-6F are side views of a connector assembly in varying stages of alignment, according to an illustrative embodiment of the invention.

DETAILED DESCRIPTION

Figure 1:
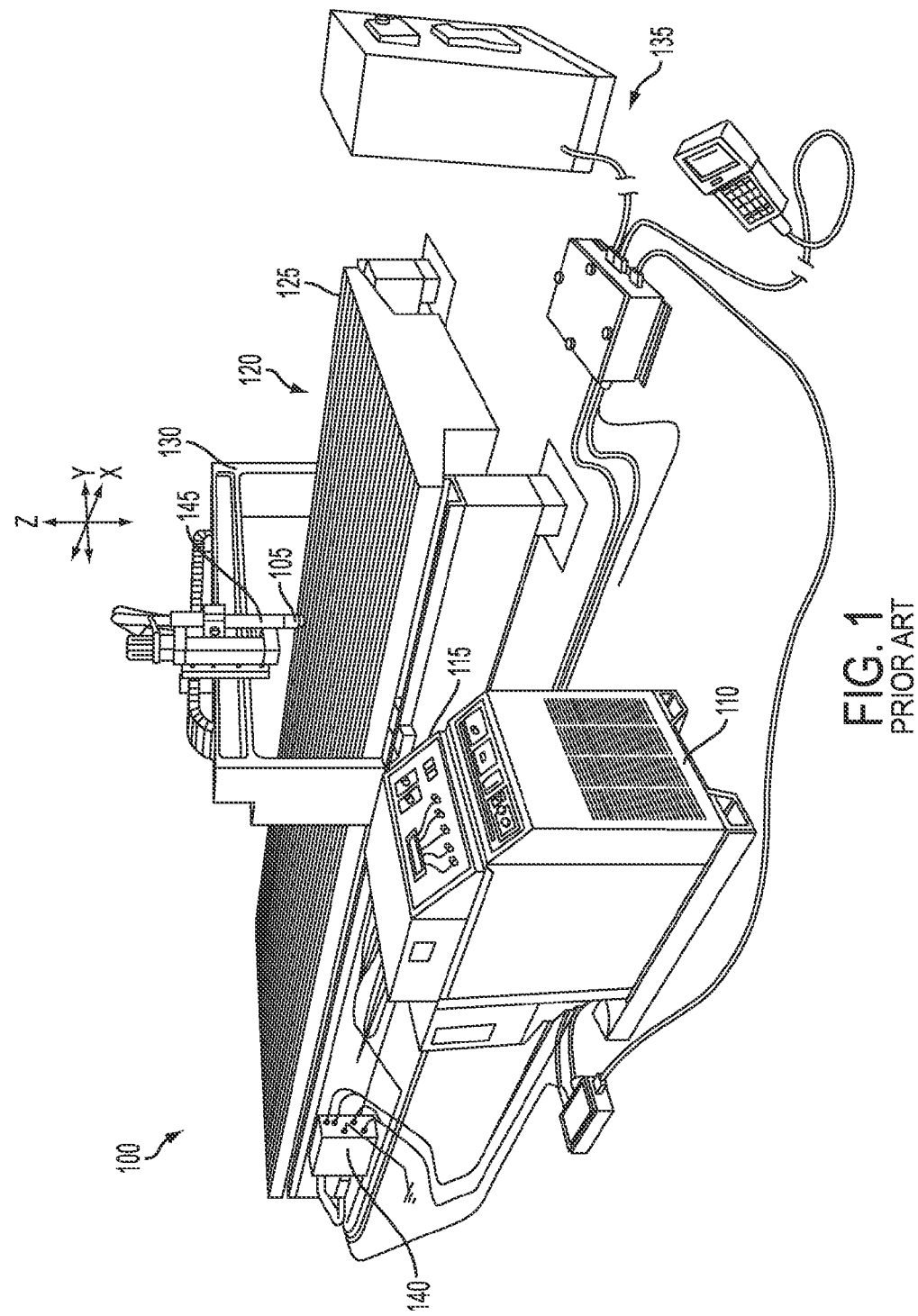
FIG. 1 is a schematic diagram of an automated plasma arc system.

FIG. 1 shows an automated plasma arc system 100. The system 100 includes a plasma arc torch 105 with an associated power supply 110 and a gas console 115 for generating a plasma arc. A positioning apparatus 120 includes a generally planar table 125 for fixturing of a workpiece (not shown), an overlaying gantry 130 having three motorized, mutually orthogonal linear axes X, Y, and Z with the torch 105 mounted on the Z axis, and a suitable controller 135 with three axis drives. The system also includes a high frequency high voltage console 140 for generating a pilot arc in the torch 105. A connector system can be used to removably couple the torch 105 to a receptacle 145. The receptacle 145 can be coupled to or within the gantry 130 making it difficult for an operator to see how the connector body, along with the internal connections (e.g., gas and coolant tubes and electrical connections), are mated with the receptacle 140. An improper connection can cause wear, leakage, and/or damage to the gas, fluid and electrical connections in a plasma torch system.

Figure 2B:
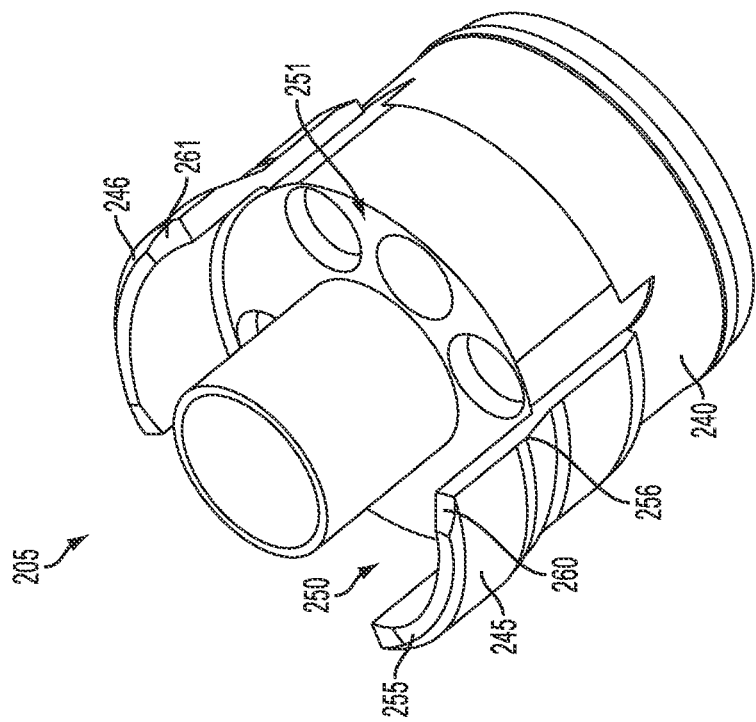
FIG. 2B is a perspective view of a receptacle side connector, according to an illustrative embodiment of the invention.
Figure 2A:
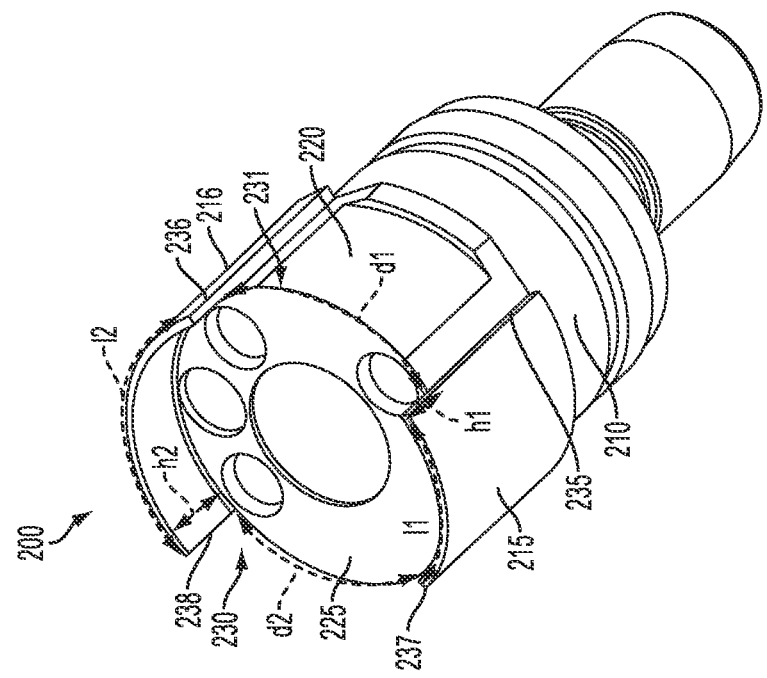
FIG. 2A is a perspective view of a torch side connector, according to an illustrative embodiment of the invention.

FIG. 2A shows a torch side connector assembly 200 and FIG. 2B shows a receptacle side connector assembly 205 that can be used to align and connect a torch and receptacle of a plasma arc torch system. The torch side connector assembly 200 includes a connector body 210 that is configured to receive a mating connector body (e.g., the receptacle side connector assembly 205). The connector body 210 can be attached to a plasma arc torch. A plurality of circumferentially shaped blades 215, 216 extend axially from a surface 220 of the connector body 210. In some embodiments, circumferentially shaped blades 215, 216 extend axially from a surface 225. The connector body can have a single circumferentially shaped blade or multiple circumferentially shaped blades. A portion of a blade ring can be formed by a circumferentially shaped blade. In some embodiments, the blade ring has a circumference that is larger than a circumference of the connector body 210. In some embodiments, the blade ring has a circumference that is equal to or less than the circumference of the connector body 210.

A single gap or a plurality of gaps can be disposed relative to the surface 220 of the connector body 210, e.g., about the blade. For example, two gaps 230, 231 can be disposed relative to the surface 220 or surface 225 of the connector body 210. The gaps 230, 231 are defined by and between edges of the circumferentially shaped blades 215, 216. For example, gap 231 is defined by a blade edge 235 of circumferentially shaped blade 215 and blade edge 236 of circumferentially shaped blade 216. Gap 230 is defined by blade edge 237 of circumferentially shaped blade 215 and blade edge 238 of circumferentially shaped blade 216.

The gaps 230, 231 have a distance d1, d2 between the edges of the circumferentially shaped blades 215, 216 that extends along a portion of the circumference of the blade ring. The distance d1 can be the distance between blade edge 235 of circumferentially shaped blade 215 and blade edge 236 of circumferentially shaped blade 216. The distance d2 can be the distance between blade edge 237 of circumferentially shaped blade 215 and blade edge 238 of circumferentially shaped blade 216. The distance d1 can be the same as the distance d2. In some embodiments, the distance, d1 is different than the distance d2. For example, the distance d1 can be greater than or less than the distance d2.

The plurality of gaps 230, 231 can be asymmetrically or symmetrically distributed about the blade ring in such a manner that only one rotational alignment position is possible. The asymmetry can be, for example, the location of the gaps 230, 231 around the blade ring. In some embodiments, the asymmetry of the gaps 230, 231 is that the distances d1 and d2 are not the same. The gaps 230, 231 can also have different shapes, which can result in the gaps being asymmetrically distributed about the blade ring. For example, gap 230 can have an approximately rectangular shape while gap 231 can have an approximately trapezoidal shape.

The asymmetry of the gaps 230, 231 can be configured to permit the alignment and mating of the torch connector 200 and receptacle connector 205 in only one rotational position. For example, if gap 230 has a distance d1 that is about 1 inch, and gap 231 has a distance d2 that is about 1.5 inches, then the corresponding blades have one blade with a distance of about 1 inch and a second blade a distance of about 1.5 inches. The second blade, having a distance of about 1.5 inches can not mate with the gap 231 because the second blade is too large. Therefore, there is only a single position that permits aligning the connector with the corresponding mating connector body.

The plurality of gaps 230, 231 are shaped to align with corresponding circumferentially shaped blade of the mating connector body, for example, the receptacle side connector assembly 205. The blades and/or gaps of the connectors can have any shape that can facilitate alignment and mating of the connector assemblies. For example, as shown in FIGS. 2A-B, the circumferentially shaped blades can be substantially rectangular or square, and can have square corners.

Similar to the torch side connector assembly 200, the receptacle side connector assembly 205 of FIG. 2B has a connector body 240 that is configured to receive a mating connector body, for example, torch side connector assembly 200. The connector body 240 is attachable to a power supply. The receptacle side connector assembly 205 has at lease one circumferentially shaped blade and at least one gap that is defined by and between edges of the circumferentially shaped blade. As shown in FIG. 2B, the connector body can have two blades 245, 246 and two gaps 250, 251.

The blades 215, 216 of the connector assembly 200 can be shaped to align with the gaps 250, 251, respectively, of connector assembly 205. Similarly, the blades 245, 246 of connector assembly 205 can be shaped to align with gaps 230, 231, respectively, of connector assembly 200. Because of the asymmetry of the gaps 230, 231, 250, 251 and or blades 215, 216, 245, 246 of the connector assemblies 200, 205, the connector assemblies 200, 205 can be properly aligned in a single rotational direction. For example, gap 250 can properly align with blade 215 but gap 250 cannot properly align with blade 216. The gap 250 can either be too big or too small or blade 215 or the gap 250 can be positioned such that the alignment of gap 250 with blade 245 results in a gap 251 being misaligned aligned with blade 216.

The shape of the circumferentially shaped blades 215, 216, 245, 246 can also facilitate alignment and mating of the connector assemblies 200, 205. As shown in FIGS. 2A and 2B, the circumferentially shaped blades 215, 216, 245, 246 are generally rectangular in shape. In some embodiments, the blades 215, 216, 245, 246 have a generally trapezoidal shape. For example, referring to blade 245, the top 255 can be smaller than the bottom 256 of the blade 245. The corresponding gap 230 can be shaped similarly, having a distance between edges 237 and 238 that decreases toward surface 225.

Referring to FIG. 2B, the blades 245, 246 can have a chamfered edge 260, 261 to help facilitate alignment and mating of the connector assemblies 200, 205. For example, once the connector assemblies 200, 205 are properly aligned, the chamfered edges 260, 261 can help facilitate movement of the blades 215, 216 into gaps 250, 251, respectively, without requiring a substantial amount of axial force by the operator to mate the connector assemblies 200, 205.

Referring to FIG. 2A, the circumferential blades 215, 216 can have varying circumferential lengths or distances l1, l2 about the circumference of the blade ring. For example, l1 can be greater than or less than l2. The circumferential blades 215, 216 can also have varying heights h1, h2 relative to surface 255 of the connector body 210. The varying circumferential lengths l1, l2 and the varying heights h1, h2 of the circumferential blades 215, 216 can help facilitate the rotational alignment of the connector assembly in a single rotational position.

Although both the torch side connector 200 and the receptacle side connector 205 are shown with blades and gaps in FIGS. 2A-2B, either the torch side connector 200 or the receptacle side connector 205 can have pockets instead of blades and gaps. For example, referring to FIG. 2A, instead of circumferentially shaped blades 215, 216, the connector body 210 can have pockets in surface 225 that extend downward into the body of the connector 200 and that correspond in size and shape to the circumferential blades 245, 246.

Figure 3A:
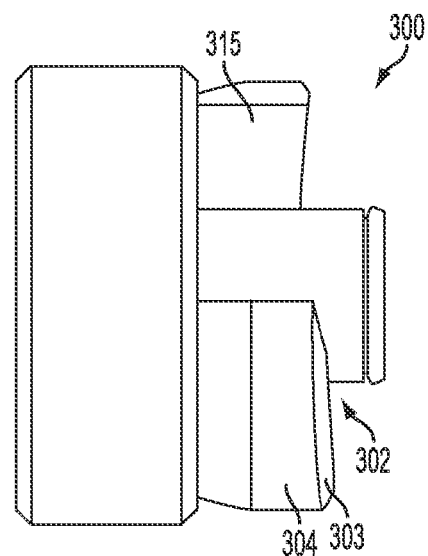
FIG. 3A is a side view of receptacle side connector having a pitch along a circumferential outer edge of a circumferentially shaped blade, according to an illustrative embodiment of the invention.
Figure 3B:
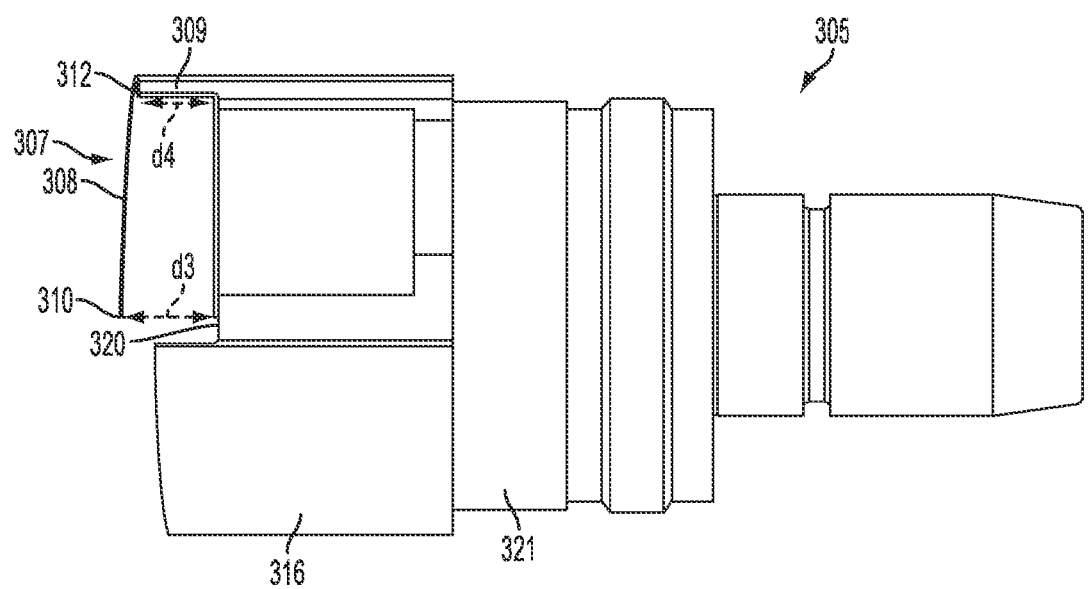
FIG. 3B is a side view of torch side connector having a pitch along a circumferential outer edge of a circumferentially shaped blade, according to an illustrative embodiment of the invention.

FIG. 3A shows a receptacle side connector 300 having a pitch 302 along a circumferential outer edge 303 of a circumferentially shaped blade 303 and FIG. 3B shows a torch side connector 305 having a pitch 307 along a circumferential outer edge 308 of a circumferentially shaped blade 309. For example, the pitch 307 can be a taper from a first point 310 of the circumferential blade 309 to a second point 312 of the circumferential blade 309.

The pitch can facilitate rotational alignment of the connector assembly. For example, the circumferentially shaped blades 304, 315 of the receptacle side connector 300 can be aligned and abutted against the circumferentially shaped blades 309, 316 of the torch side connector 305. When a rotational motion is applied by the user to either the receptacle side connector 300 or the torch side connector 305, the pitch can facilitate rotation in a single direction, e.g., a clockwise direction. Even absent application of a rotational motion by the user, the pitch feature can generate such a motion. This can be especially beneficial in a mechanized torch where the operator may not be able to see how the connector assembly or the internal components of the connector assembly are aligned.

In some embodiments, the pitch of the outer edge 308 of the circumferentially shaped blade 309 is about 0.25 inches per 5.2 inches. The specific pitch of the outer edge of the circumferentially shaped blade can determine how easily the connector assembly can be rotated in a desired direction or how much the rotation of the connector assembly in an undesired direction is impeded. For example, a large pitch (e.g., a steep slope) of the outer edge of the circumferentially shaped blade, can result in a user more easily rotating the connector assembly in the desired direction (e.g., clockwise) than in the undesired direction (e.g., counter-clockwise).

Figure 4:
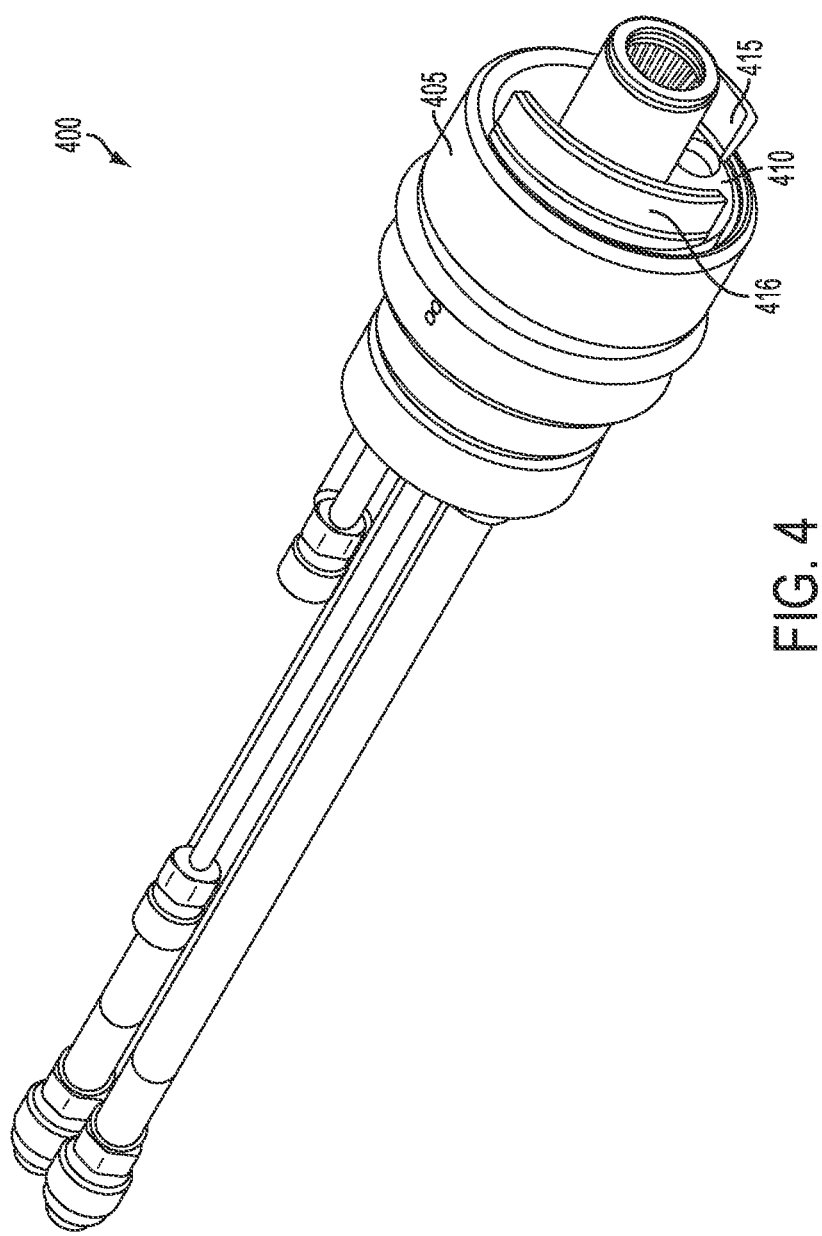
FIG. 4 is a perspective view of a connector body and exterior shell, according to an illustrative embodiment of the invention.

FIG. 4 is shows a connector body 400 and an exterior shell 405. The exterior shell 405 can be configured to receive a connector body 410. The connector body 410 can be mated with the shell 405 by, for example, a threaded connection or a friction fit. The exterior shell 405 can surround at least a portion of the connector body 410. In some embodiments, as shown in FIG. 4, the blades 415, 416 of the connector body 410 extend past the exterior shell 405. In other embodiments, the blades 415, 416 are completely encompassed within the exterior shell 405 and do not extend past the exterior shell 405.

Figure 5C:
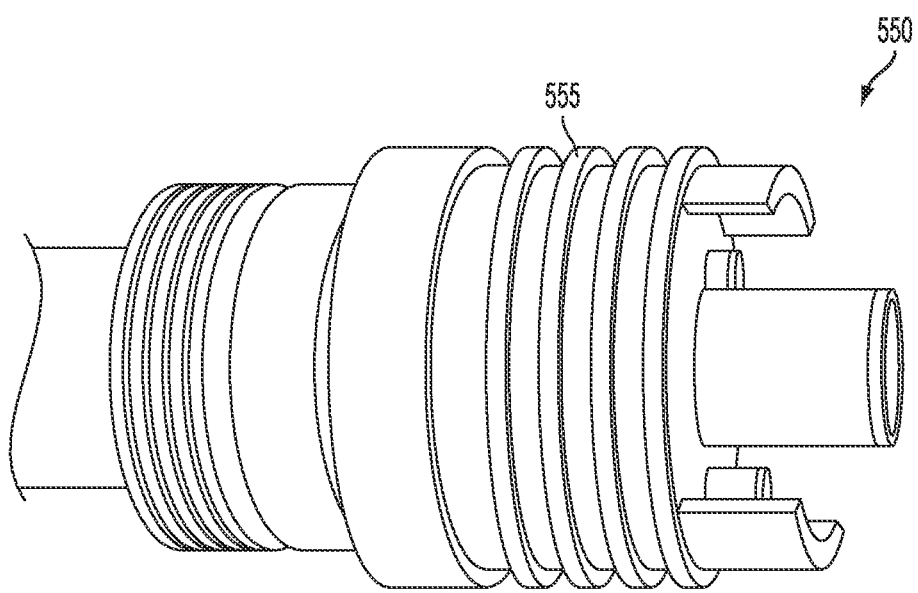
FIG. 5C is a side view of a connector body capable of receiving a coupling nut, according to an illustrative embodiment of the invention.

FIGS. 5A and 5B show a connector body 500 with alignment features 505, 506, and a coupling nut 510. The alignment features 505 can be on an exterior surface of the connector body (e.g., surface 220 of connector connecter assembly 200 shown in FIG. 2A) or the alignment features can be on an exterior surface 515 of an exterior shell 520. The alignment features 505, 506 can be a series of dots, for example alignment feature 505 is comprised of two dots and alignment feature 506 is comprised of three dots. Alignment features of a torch side connector can correspond to alignment features of a receptacle side connector to help an operator determine the correct alignment of the connector assembly. For example, alignment feature 505 comprising two dots can match an alignment feature on a receptacle that also comprises two dots. The alignment features can also be hash marks or arrows. If an alignment feature that comprises two dots becomes matched with an alignment feature comprising, for example, three dots or a single dot, during alignment of the connector assembly, the operator will know that the connector assembly is not aligned properly. The alignment feature can help prevent the connector assembly from being misaligned and reduce unnecessary wear, leakage, and/or damage to the gas, fluid, and electrical connections in the torch and/or receptacle.

The coupling nut 510 can be coupled to the exterior surface 515 of the exterior shell 520. In some embodiments, the coupling nut 510 is coupled to an exterior surface of the torch side connector and/or the receptacle side connector. The coupling nut 510 is configured to reversibly join the connector assembly and the mating connector assembly. For example, the coupling nut 510 can comprise threads (not shown) that can mate with corresponding threads of a corresponding connector assembly or exterior shell. For example, referring to FIG. 5C, a mating connector assembly 550 can include threads 555 on to which the coupling nut 510 of FIGS. 5A and 5B can be threaded. Once the connector assembly is aligned and mated in the correct position, the coupling nut can be secured to ensure that the connector assembly maintains the correct, predetermined position. The coupling nut 510 can be easily removed to allow replacement of the connector assembly or access to the internal fluid and electrical connections. The coupling nut 510 can be, for example, located between, and used to connect, the torch 105 and receptacle 145 of FIG. 1.

A plasma arc torch system can utilize the connector assembly having a blade ring (e.g., the connector assemblies and mating connector assemblies of FIGS. 2A-B, 3A-B, 4, and 5A-B) to couple the torch body to a receptacle. The receptacle can be housed in a power supply, in a gantry, or can be disposed on a lead. In some embodiments, the receptacle has a corresponding blade ring that is shaped to align with the blade ring of the connector assembly. The blade ring connector assembly design can include a connector body that is capable of coupling the distal end of the torch to a receptacle. The connector assembly can include a portion of a blade ring that extends axially from a surface of the connector body. Referring to FIG. 3B, the blade ring can have a first top edge located near point 310 and a second top edge located near point 312. An axial distance d3 of the first top edge can be greater than an axial distance d4 of the second top edge relative to a surface 320 of the connector body 321. In some embodiments, the outer edge 308 of the circumferentially shaped blade 309 tapers from the first point 310 or first top edge to the second point 312 or second top edge. The outer edge 308 of the circumferentially shaped blade 309 can also have a stepped, castellated or curved surface.

FIGS. 6A-6F show a connector assembly 600 in varying stages of alignment. A connector body 605 and a mating connector body 610 can be aligned by first abutting the connector body 605 with the mating connector body 610, rotating either the connector body 605 or the mating connector body 610 until the blades of the connector body 605 align with the gaps of the mating connector body 610 and vice versa, and axially biasing either the connector body 605 or the mating connector body 610 towards the other component. As shown in FIGS. 6A-F, the connector body 605 is a torch side connector and is capable of mating with a plasma arc torch and the mating connector body 610 is a receptacle side connector and is capable of mating with a receptacle or a power supply. In some embodiments, the connector body is the receptacle side connector and the mating connector body is the torch side connector.

The connector body 605 can include two circumferentially shaped blades 615, 616 and two gaps 620, 621. Similarly, the mating connector body 610 has two circumferentially shaped blades 625, 626 that correspond with the gaps 620, 621 of the connector body 605. The mating connector body 610 also has two gaps 630, 631 that correspond with the circumferentially shaped blades 615, 616 of the connector body 605. Gap 630 can be defined by edge 635 of circumferentially shaped blade 625 and edge 636 of circumferentially shaped blade 626. Gap 631 can be defined by edge 640 of circumferentially shaped blade 625 and edge 641 of circumferentially shaped blade 636.

In some embodiments, the connector body 605 has an exterior shell 645 that surrounds at least a portion of the connector body 605. As shown in FIGS. 6A-6F, the exterior shell 645 can extend past the circumferentially shaped blades 615, 616. In some embodiments, the exterior shell does not extend past the circumferentially shaped blades.

Referring to FIG. 6B, the circumferentially shaped blades 615, 616 of the connector body 605 can be abutting against an aligning surface of the mating connector body 610. For example, the operator can bring the connector body 605 into contact with the aligning surface of the mating connector body. The aligning surface can be, for example, the circumferentially shaped blades 625, 626 of the mating connector body. The lengths of the circumferentially shaped blades 615, 616, 625, 626 can vary. For example, circumferentially shaped blade 615 of the connector body can be longer than circumferentially shaped blade 616. Similarly, circumferentially shaped blade 625 can be longer than circumferentially shaped blade 626. These varying lengths can help facilitate proper alignment.

The connector body 605 can be rotated relative to the mating connector body 610. For example, the connector body 605 can be rotated in the direction shown by the arrow in FIG. 6B. In some embodiments, the mating connector body 610 is turned relative to the connector body 605. The rotation of the connector body or mating connector body continues until the circumferentially shaped blades 615, 616 of the connector body 605 reach the corresponding gaps 630, 631 of the mating connector body 610. The different shapes, heights, and lengths of the circumferentially shaped blades 615, 616, 625, 626 can help indicate when the connector assembly 600 is properly aligned. For example, referring to FIG. 6E, when the connector assembly is properly aligned, rotation of the connector body 605 is restricted relative to the mating connecting body 610 at an alignment point 650. This positive stop point 650 indicates to the operator that the connector assembly 600 is properly aligned, without the operator having to visually see the connector assembly. The operator can feel when the positive stop point 650 is reached and can then press the connector assembly towards the mating connector assembly.

Referring to FIG. 6F, when the connector assembly 600 is properly aligned, the connector body 605 can be axially biased or pressed towards the mating connector body 610. The circumferentially shaped blades 615, 616 of the connector body 605 mate with the corresponding gaps 630, 631 of the mating connector body. Rotational movement of the connector body 605 relative to the mating connector body is restricted when the circumferentially shaped blades mate with the corresponding gaps.

The rotation of the connector body 605 relative to the mating connector body 610 can be facilitated by a pitch 655 along a circumferential edge 660 along the blade ring. The pitch 655 can provide a guide to the operator to help rotate the connector body 605 in a single direction, e.g., the direction indicated by the arrow of FIG. 6B. In addition, the pitch 655 can help provide a positive stop point (e.g., point 650 of FIG. 6E) when the connector assembly 600 is properly aligned.

When the connector assembly 600 is fully aligned as shown in FIG. 6F, the connector body 605 can be coupled to the mating connector body 610 with a coupling nut (e.g., coupling nut 510 of FIG. 5A). The coupling nut can ensure that the connector assembly remains connected during operation of the torch. The coupling nut can be disposed on the exterior surface of the exterior shell 645 or it can be disposed director on the connector body 605 or mating connector body 610. The coupling nut can be reversibly couple the connector body 605 to the mating connector body 610, for example, by using threads, to allow an operator to easily and quickly attach and remove the connector assembly.

Although various aspects of the disclosed apparatus and method have been shown and described, modifications may occur to those skilled in the art upon reading the specification. The present application includes such modifications and is limited only by the scope of the claims.

What is claimed is:

1. A connector assembly for coupling a plasma torch to a receptacle, the connector assembly comprising:
    a connector body configured to receive a mating connector body, the connector body attachable to the receptacle or the plasma arc torch;
    at least one circumferentially shaped blade extending axially from a surface of the connector body, the at least one circumferentially shaped blade forming a portion of a blade ring; and
    at least one gap disposed relative to the surface of the connector body defined by and between edges of the at least one circumferentially shaped blade, a distance of the at least one gap between the edges of the at least one circumferentially shaped blade extending along a portion of the circumference of the blade ring,
    wherein the at least one gap is distributed about the blade ring, the at least one gap shaped to align with a corresponding circumferentially shaped blade of the mating connector body.

2. The connector assembly of claim 1 wherein the at least one circumferentially shaped blade has a pitch along a circumferential outer edge along the blade ring to facilitate rotational alignment of the connector assembly.

3. The connector assembly of claim 2 wherein the pitch of the at least one circumferentially shaped blade is about 0.25 inches per 5.2 inches.

4. The connector assembly of claim 1 further comprising a plurality of circumferentially shaped blades, edges of the plurality of circumferentially shaped blades defining a plurality of gaps.

5. The connector assembly of claim 4 wherein the plurality of gaps are asymmetrically distributed about the blade ring.

6. The connector assembly of claim 4 wherein the plurality of circumferentially shaped blades are asymmetrically distributed about the blade ring.

7. The connector assembly of claim 4 wherein the circumferentially shaped blades have varying circumferential lengths.

8. The connector assembly of claim 4 wherein the circumferentially shaped blades have varying heights.

9. The connector assembly of claim 1 wherein the at least one gap is configured to align with the corresponding circumferentially shaped blade of the mating connector body in a single rotational position.

10. The connector assembly of claim 4 wherein the plurality of gaps are configured to align with the corresponding circumferentially shaped blades of the mating connector body in a single rotational position.

11. The connector assembly of claim 1 further comprising an exterior shell configured to receive the connector body and surrounding at least a portion of the connector body.

12. The connector assembly of claim 11 further comprising a coupling nut coupled to an exterior surface of the exterior shell, the coupling nut configured to reversibly join the connector assembly and the mating connector assembly.

13. The connector assembly of claim 1 further comprising the mating connector body, the mating connector body configured to receive the connector body.

14. A plasma arc torch comprising:
    a torch body having a distal end and a proximal end;
    torch fittings extending from the distal end of the torch body, the torch fittings comprising an electrical connector and a plurality of fluid connectors;
    a connector assembly having a connector body and capable of coupling the distal end of the torch body to a receptacle, the connector assembly comprising:
        at least a portion of a blade ring extending axially from a surface of the connector body, the blade ring having a first top edge and a second top edge, wherein an axial distance to the first top edge is greater than an axial distance to the second top edge relative to the surface of the connector body, the at least a portion of a blade ring forming a circumferentially shaped blade, the circumferentially shaped blade having a pitch, wherein the pitch can facilitate a rotational alignment of the connector assembly.

15. The connector assembly of claim 14 further comprising a coupling nut coupled to an exterior surface of the connector body, the coupling nut configured to reversibly join the torch body and the receptacle.

16. The connector assembly of claim 14 wherein the receptacle has a corresponding blade ring shaped to align with the blade ring of the connector assembly.

17. The connector assembly of claim 14 wherein the blade ring comprises a plurality of circumferentially shaped blades, edges of the plurality of circumferentially shaped blades defining a plurality of gaps.

18. The connector assembly of claim 14 wherein rotational movement of the connector body relative to the receptacle is restricted at an alignment point.

* * * * *